(12) United States Patent
Chatte

(10) Patent No.: US 8,341,093 B2
(45) Date of Patent: Dec. 25, 2012

(54) METHOD OF PERFORMING NON-SECURE FRANKING WITH STAMPS FROM BOOKS

(75) Inventor: Fabien Chatte, Nogent sur Marne (FR)

(73) Assignee: Neopost Technologies, Bagneux (FR)

( * ) Notice: Subject to any disclaimer, the term of this patent is extended or adjusted under 35 U.S.C. 154(b) by 729 days.

(21) Appl. No.: 11/844,790

(22) Filed: Aug. 24, 2007

(65) Prior Publication Data
US 2008/0071636 A1    Mar. 20, 2008

(30) Foreign Application Priority Data
Sep. 15, 2006   (FR) ...................................... 06 53754

(51) Int. Cl.
*G06Q 30/00* (2012.01)
*G06F 17/00* (2006.01)
*G07B 17/02* (2006.01)

(52) U.S. Cl. ...................................... 705/341; 705/408

(58) Field of Classification Search .................. 705/408, 705/341
See application file for complete search history.

(56) References Cited

U.S. PATENT DOCUMENTS
2003/0074325 A1    4/2003  Ryan, Jr.
2004/0002926 A1*   1/2004  Coffy et al. .................... 705/401
2004/0186811 A1*   9/2004  Gullo et al. .................... 705/402

FOREIGN PATENT DOCUMENTS
CA    2494124 A1    2/2004
EP    1435593 A2    7/2004

OTHER PUBLICATIONS
"Mobil's New Oil Analysis Program Offers Predictive Approach to Monitoring Condition of Vessels and Equipment" Business Wire. Dec. 5, 1996.*

* cited by examiner

*Primary Examiner* — John Hayes
*Assistant Examiner* — Allen J Jung
(74) *Attorney, Agent, or Firm* — Sughrue Mion, PLLC

(57) ABSTRACT

A method of performing non-secure franking by means of a communications terminal comprising means for communicating with a franking service provider's server, a non-secure memory for recording identification numbers and associated postage amounts received in the franking service provider's server. The communications terminal can further comprise print command means for instructing a standard printer to print one of the identification numbers corresponding to the desired postage amount and extracted from the non-secure memory on a mail item to be sent.

4 Claims, 2 Drawing Sheets

METHOD OF PERFORMING NON-SECURE FRANKING WITH STAMPS FROM BOOKS

FIELD OF THE INVENTION

The present invention relates to the field of mail handling, and it relates more particularly to a method of performing non-secure franking from books of electronic stamps.

PRIOR ART

Conventionally, printing postage imprints (i.e. electronic stamps) by means of a postage meter or "franking machine" of the closed type or of the open type is secure and requires use of a Postal Security Device (PSD) that can be integrated (closed system) or not integrated (open system) into said postage meter. The first purpose of such a PSD is to compute and to sign the postage imprint as a function of various postal information relating to the mail item (format, weight, service, etc.) and to the postage meter (serial number, customer number, etc.). The second purpose of such a PSD is to invoice the customer for each generation of a postage imprint. Each time a postage imprint is generated, the PSD debits an internal counter for the corresponding amount of postage. That is why such a PSD must be made secure both physically, by means of mechanical and thermal protections, and also digitally, by means of a process of signing the postage imprint. The same applies to the re-crediting link between the postage meter and the server of the dealer for said postage meter, which link must be encrypted. As a result, the PSD is a complex and expensive module, and it is therefore very advantageous to omit it for bottom-of-the-range franking as desired by private individuals or very small businesses.

One known solution for meeting the demand from this type of customer is on-line printing whereby the PSD is moved to the dealer's server. Whenever a customer/user wishes to perform franking, the user must thus connect up to the server, e.g. by means of the user's personal computer (PC), in order to obtain authorization, after paying a corresponding amount, for printing a postage imprint on the user's personal printer.

Unfortunately, that solution is satisfactory only for printing out a single stamp because, when a plurality of stamps need to be printed out, that solution becomes lengthy to implement and time-consuming in terms of communication time with the dealer's server.

OBJECT AND DEFINITION OF THE INVENTION

An object of the present invention is to mitigate the above-mentioned drawbacks by proposing a method of performing non-secure franking that makes it possible to print books of electronic stamps.

This object is achieved by a method of performing non-secure franking with postage imprints, said method comprising the following steps:

a user connecting up to the site of a franking service provider by means of a communications terminal of the user;

the user ordering desired numbers of postage imprints for desired postage amounts from the site of the franking service provider, and making corresponding payment;

the server of the franking service provider generating a unique identification number for each of the postage imprints paid for in this way;

the franking service provider transmitting the identification number and the associated postage amount for each paid-for postage imprint to the user's communications terminal; and the user transcribing one of the identification numbers corresponding to the desired postage amount by hand onto a mail item to be sent, and then transcribing the next numbers as and when needed by said user;

wherein said identification numbers and postage amounts received from said server are recorded in a non-secure memory of the communications terminal, and, for each paid-for postage imprint, said identification number and said associated postage amount are stored in a database of the franking service provider, access to which database is shared with a server of the postal administration, in order to make it possible to delete the identification numbers that are recognized when the mail items are collected by the postal administration.

Thus, the invention removes the need to use a PSD or any other equivalent security means, since the validity of a postage imprint results merely from an identification number being recorded in a database to which access is shared with the postal administration.

Preferably, said transcribing by hand also includes transcribing by hand the postage amount associated with said printed identification number.

In a particular implementation, said step of transcribing by hand is replaced with the following steps:

the user issuing a print command, from the communications terminal, to instruct a standard printer to print one of the identification numbers corresponding to the desired postage amount onto a mail item; and deleting the identification number printed in this way from the identification numbers recorded in the user's communications terminal.

Thus, the transcription is no longer performed by hand by the user, but rather automatically by means of a standard printer.

In a variant implementation, said print command can also include printing the postage amount associated with said printed identification number, or printing variable data created in the communications terminal or in the standard printer during the printing and/or static data pre-recorded in the communications terminal or in the standard printer. Said static and/or variable data can include the following elements: a logo, a stamp background, and the day's date.

The invention also provides a method of enabling the postal administration to verify the validity of a postage imprint borne on a mail item, said method comprising the following steps:

inputting a unique identification number printed on said mail item;

comparing the identification number input in this way with identification numbers present in a database to which access is shared between a server of a franking service provider and a server of a postal administration; and when the compared numbers are identical, deleting the recognized identification number from the shared-access database.

In another variant implementation, said comparison step can further comprise comparing the printed postage amount with a postage amount computed by the postal administration on the basis of the collected mail item.

The invention also provides a communications terminal making it possible to perform non-secure franking with postage imprints, said communications terminal comprising:

communications means for communicating with a franking service provider's server; and a non-secure memory for recording identification numbers and associated postage amounts received in the franking service provider's server; and optionally print command means for instructing a standard printer to print one of the identification numbers corresponding to the desired postage amount and extracted from the non-secure memory on a mail item to be sent.

When possible, the terminal can further comprise means for deleting the identification number printed in this way from the identification numbers recorded in the non-secure memory.

In a variant embodiment, said print command means are also suitable for causing the postage amount and static and/or variable data to be printed on the mail item to be sent.

The invention also provides a management server making it possible to perform non-secure franking with postage imprints, said management server comprising:

means for communicating with a user's communications terminal;

means for generating a unique identification number for each of the postage imprints paid for by the user;

means for storing the identification numbers and associated postage amounts corresponding to the postage imprints paid for by the user in a database to which access is shared with a server of a postal administration;

means for transmitting the identification numbers and associated postage amounts corresponding to the postage imprints paid for by the user to the user's communications terminal; and means for deleting, from said database, the identification numbers corresponding to the identification numbers printed on the mail items that have reached the postal administration.

The invention also provides a computer program that is downloadable from a communications network and/or that is stored on a computer-readable recording medium, said computer program comprising code instructions for executing the steps of the above-mentioned method of performing non-secure franking, when it is executed on the communications terminal.

The invention finally provides a recording medium on which the computer program is stored.

BRIEF DESCRIPTION OF THE DRAWINGS

Other characteristics and advantages of the present invention appear more clearly from the following description given by way of non-limiting indication, and with reference to the accompanying drawings, in which.

DETAILED DESCRIPTION OF A PREFERRED IMPLEMENTATION OF THE INVENTION

The invention aims to enable a private individual or a very small business to frank mail without having to use a Postal Security Device (PSD), be it associated with a postage meter or with a server of a franking service provider.

To this end, it is proposed to replace the PSD merely with a standard, non-secure memory that contains a series of postage imprints representing one or more books of electronic stamps that the user has procured from a specialist server.

Figure 1:
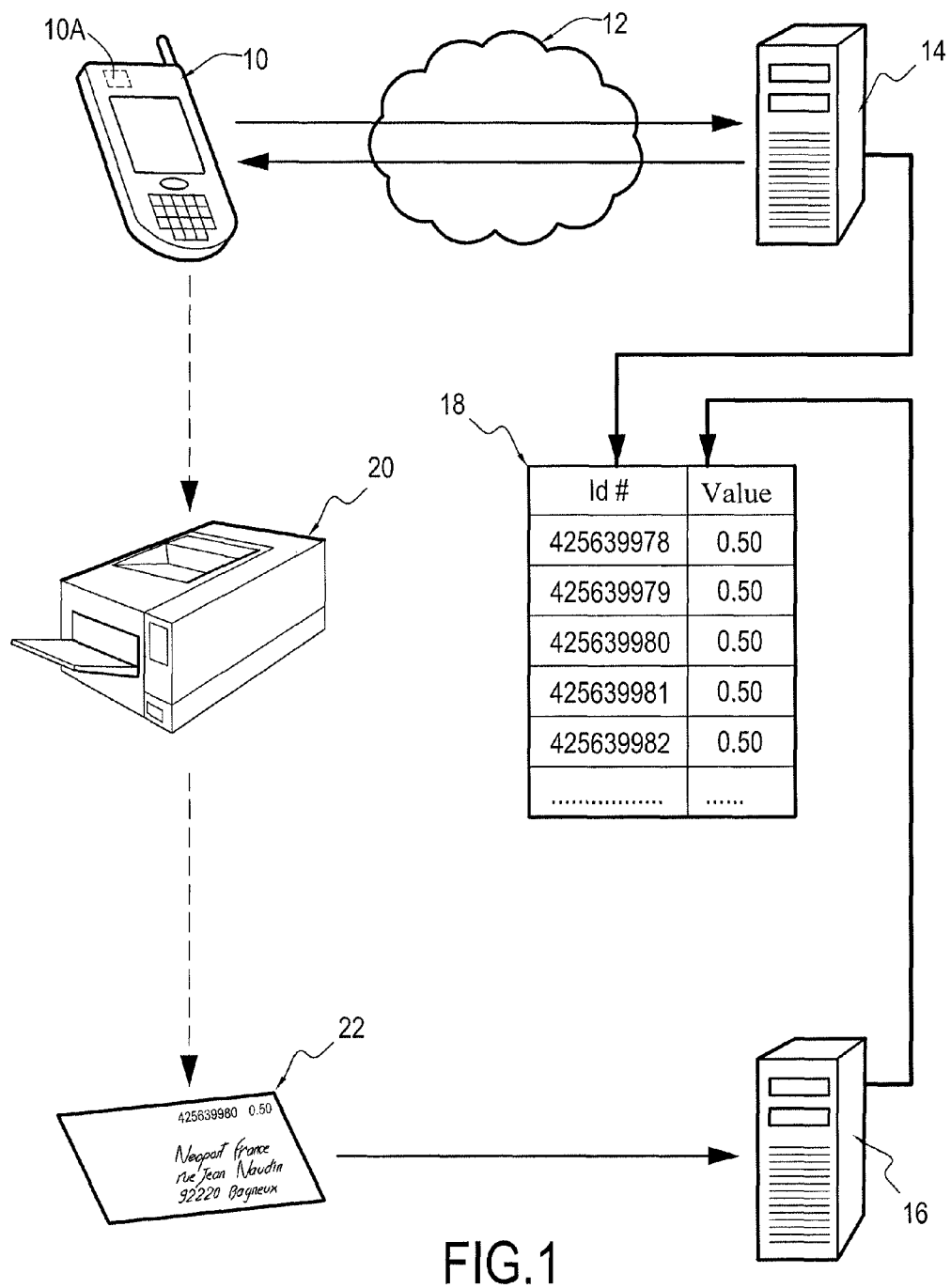
FIG. 1 is an example of network architecture making it possible to implement the method of the invention for performing non-secure franking.

FIG. 1 shows an example of network architecture making it possible to implement the method of the invention for performing non-secure franking.

This communications and computer network is organized around a communications terminal 10 that is either portable (such as a mobile telephone, a web-enabled laptop computer, a web-enabled personal digital assistant, or a web-enabled games console, etc.) or not portable (such as a desktop computer, or a self-service kiosk machine, etc.) and that, via a communications network (preferably a third-generation (3G) network or the Internet 12), is in communication with a server of the postal administration 16, with which server it shares a database 18. When the postage imprint is not transcribed by hand by the user, a standard printer 20 connected to the communications terminal in wired or wireless manner, via a short-range radio link (in particular Bluetooth®) or via an infrared link, for example, is available for printing a postage imprint on an envelope 22 or on a label to be stuck to a thick envelope or parcel to be sent.

Figure 2:
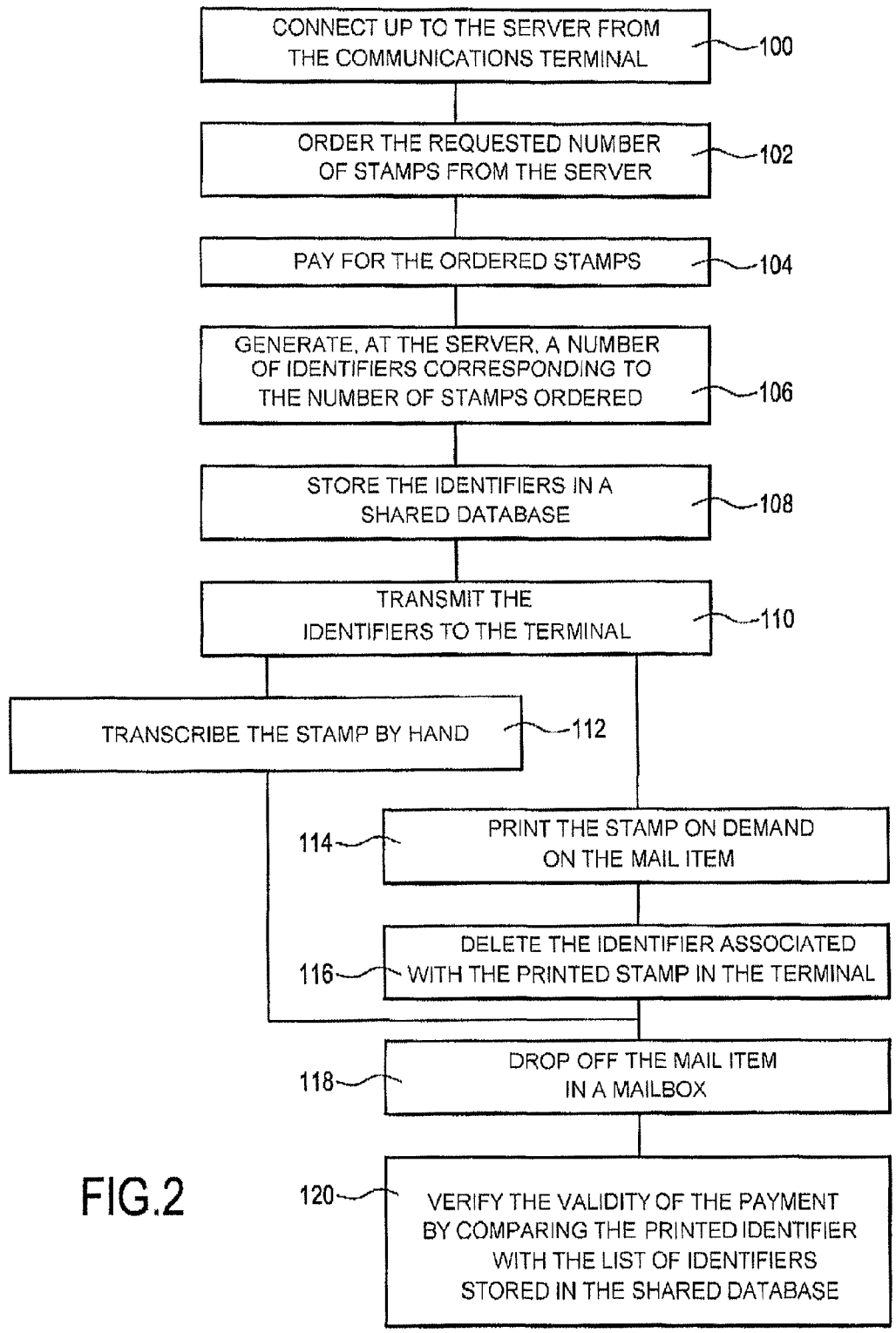
FIG. 2 is a flow chart showing the various steps of the method implemented over the network of FIG. 1.

FIG. 2 shows the various steps of the method of performing non-secure franking that is implemented in the network.

In a first step 100, by means of the user's communications terminal, said user can connect up to the franking service provider and, in a step 102, order desired numbers of electronic stamps for desired amounts, e.g. 25 50-cent stamps, 10 10-cent stamps, 10 5-cent stamps, etc.

In a step 104, the user pays for the stamps by any payment means available to said user. Such payment means can be payment by indicating credit card references to the server, by debiting a prepaid card and informing the server of the corresponding debit, or merely by debiting a customer account if the user has such an account with the service provider, for example.

The server of the franking service provider then, in a step 106, generates an identifier for each of the paid-for stamps, which identifier is constituted by a unique identification number, i.e. in the above-mentioned example, said server generates 45 identification numbers. Each of the identification numbers associated with the corresponding amount of the stamp is then, firstly, in a step 108, stored in the database shared with the postal administration, and secondly, in a step 110, transmitted to the communications terminal of the user for the purpose of being recorded in a non-secure memory 10A of said terminal.

It can be observed that, in accordance with the invention, each postal imprint or electronic stamp is thus actually merely constituted by a unique identification number without any signature or any encrypted element.

The user is then in possession of a set of electronic stamps that said user can use at will, until there are no stamps left in the set (as the user would do with a book of stamps) without having to re-connect up to the franking service provider every time a stamp is printed.

In particular, it is thus possible, in a step 112, for the user to transcribe by hand, the unique identification number, optionally together with the postage amount that is associated therewith, directly onto the mail item to be sent 22, and then for said user to post said mail item (step 118).

In an alternative step 114, it is also possible for the user to instruct the printer to print a stamp for the desired postage amount onto the envelope to be sent or onto a label to be stuck to a parcel to be sent. This printing can be limited to printing merely the identification number, or it can also include printing the postage amount and static data pre-recorded in the terminal and received previously from the server (or extracted from a smart card issued by the service provider and inserted previously into the terminal or into the printer), e.g. a logo or a stamp background (in the form of an eagle for the United States of America), and variable data such as the day's date created in the communications terminal or directly in the printer during printing.

When possible, instructing such printing to take place results, in a step 116, in the identification number associated with the stamp printed in this way being deleted (removed) from the list of identification numbers received from the server and available in the non-secure memory of the communications terminal of the user.

Once the envelope or the parcel has been franked in this way, the user then, in a step 118, merely has to drop it off in a mailbox or with a collection office of the postal administration who can verify the validity of the franking performed by the user, by inputting the unique identification number printed on the mail item and by comparing it with the identification numbers present in the database, access to which is shared, (step 120). If the compared numbers are identical, the recognized number is then deleted from the database, any subsequent mail items bearing the same number then being rejected by the postal administration as being synonymous with counterfeit stamps.

Naturally, most of the steps of the method are performed by a computer program that can be downloaded from a communications network or that can be stored on a computer-readable recording medium and that can then be recorded in a memory in the communications terminal.

Thus, although it does not implement a PSD, the method of the invention for performing non-secure franking nevertheless guarantees to the postal administration that its franking is paid for because the comparison with the database containing the list of identification numbers for which payment has been made makes it possible for the postal administration to refuse to their senders to carry any mail items bearing unknown identification numbers or numbers that have already been processed since they are not present in the shared database.

What is claimed is:

1. A method of performing non-secure franking with postage imprints, said method comprising the following steps:
    a user connecting up to the site of a franking service provider by means of a communications terminal of the user;
    the user ordering desired numbers of postage imprints for desired postage amounts from the site of the franking service provider, and making corresponding payment;
    a server of the franking service provider generating a unique identification number for each of the postage imprints paid for through said corresponding payment;
    the franking service provider transmitting the identification number and the associated postage amount for each paid-for postage imprint to the user's communications terminal;
    the user issuing a print command, from the communications terminal, to instruct a printer to print the identification number corresponding to a first one of the postage imprints onto a mail item, and then issuing further print commands to print the identification numbers corresponding to subsequent postage imprints as and when needed by said user;
    deleting the identification number printed by the print command from the identification numbers recorded in the user's communications terminal,
    wherein said identification numbers and postage amounts received from said server are recorded in a non-secure memory of the communications terminal, and, for each paid-for postage imprint, said identification number and said associated postage amount are stored in a database of the franking service provider, access to which database is shared with a server of a postal administration, in order to delete the identification numbers that are recognized when the mail items are collected by the postal administration.

2. A method according to claim 1, wherein said print command also includes printing the postage amount associated with said printed identification number.

3. A method according to claim 1, wherein said print command also includes at least one of (1) printing variable data created in the communications terminal or in the standard printer during the printing and (2) static data pre-recorded in the communications terminal or in the standard printer.

4. A method according to claim 3, wherein said at least one of variable data and static data includes the following elements:
    a logo, a stamp background, and the day's date.

* * * * *